March 23, 1948.　　　　　L. HEGY　　　　　2,438,283
SWITCHING SYSTEM
Filed Jan. 13, 1945　　　　2 Sheets-Sheet 2

INVENTOR.
LOUIS HEGY
BY
EWoodbury
ATTORNEY

Patented Mar. 23, 1948

2,438,283

UNITED STATES PATENT OFFICE 2,438,283

SWITCHING SYSTEM

Louis Hegy, Burbank, Calif., assignor to Bendix Aviation Corporation, South Bend, Ind., a corporation of Delaware Application January 13, 1945, Serial No. 572,644

5 Claims. (Cl. 318—33)

This invention relates to electrical control systems for selectively controlling the movement of a shaft, carriage, or the like, in either direction, into any one of a plurality of predetermined positions hereinafter referred to as stations.

An object of the invention is to provide a particularly reliable and effective switching circuit and mechanism for control systems of this type.

A more specific object is to provide a switch mechanism and circuit for such control systems that will stop the moving object at the same intermediate station when approaching that station from either direction, without the risk of hunting.

Another specific object is to provide a satisfactory switching mechanism and circuit, for such control systems, that utilizes cam-actuated snap-action switches for automatically stopping the moving object instead of employing commutators and brushes.

Another object is to prevent hunting of the movable member back and forth through a station in the event of excessive overrunning or coasting after the driving power has been disconnected.

It is old to provide devices such as elevators with automatic control so that by the proper movement of a master selector switch, or pushbutton, the member will be set into motion toward a desired station and will be automatically stopped when it reaches the station by a switch actuated in synchronism with the movement of the device. Similar systems are useful for the remote control of objects that are to be moved into any one of several predetermined positions or stations.

Where such devices are to be moved in either direction between two end positions it is necessary to have two separate switches associated with each station, for de-energizing the driving member during movement in both directions. Thus, when the moving member moves into one station from one direction, a switching device must be actuated for stopping the movement in that direction without preventing the reverse movement of the member out of that station, and a second switch must be provided for performing a similar function when the member is moving into the same station from the other direction.

Both these switches must be associated with the same master switch if a single master switch is to be employed for moving the member into the desired station irrespective of its previous position. As a result, the two switching devices associated with each station must be operated successively, instead of simultaneously, and the interval must be greater than the greatest coasting movement of the member; otherwise the member might hunt back and forth through the selected station instead of stopping. In practice, it has been difficult to devise switching systems that would be free from hunting under varying conditions of service, and that would also stop the object accurately at the station irrespective of the direction of movement.

It has been most common practice in previous systems for automatically stopping objects at intermediate stations to employ switching devices of the commutator and brush type, in which relative movement was effected between the brushes and commutators in synchronism with the movement of the object to be controlled. Brushes and commutators have the practical disadvantages of being subject to excessive arcing and burning when they break a motor circuit carrying appreciable current. In addition, brushes and commutators break the circuit in the same position when moving in one direction that they close the circuit when moving in the opposite direction. As will be explained more fully hereinafter, there are advantages in having a time lag in the operation of the contact mechanism when moving in one direction as compared to the operation in the other direction.

In accordance with the present invention, I have eliminated the afore-mentioned disadvantages of commutators and brushes, and have attained certain additional advantages, by employing snap-action switches actuated by cams which are driven in synchronism with the moving member. One additional advantage is that I am able to utilize the inherent lost motion of snap-action switches to obtain accurate stopping of the moving member at a station irrespective of the direction from which the member approaches the station, without increasing the risk of hunting. The manner in which this object is achieved, together with other specific objects and features of the invention, will become apparent from the following detailed description of an embodiment of the invention illustrated in the attached drawing in which:

Fig. 1 is a general layout of apparatus that may be employed in practicing the invention;

Fig. 2 is a detailed sectional view showing one type of snap-action switch that may be employed in the system, the section being taken in the plane II—II of Fig. 3;

Figure 5:
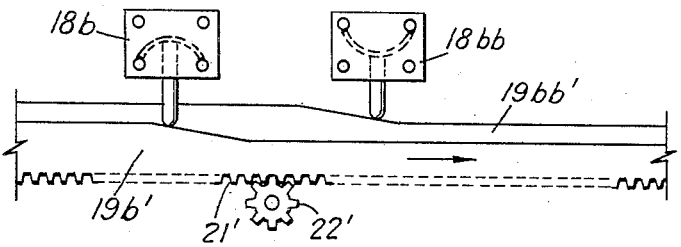
Figure 6:
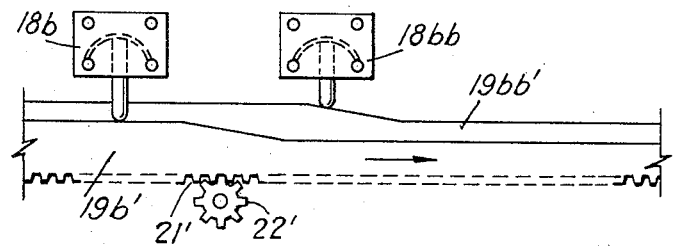

Fig. 3 is a view of the switch shown in Fig. 2, contacts 27 and 26 of switch 18b and through the upper contacts of switch 18d to the motor through field winding 49, which ran the motor in such direction as to rotate the hand 11 clockwise, as indicated by the arrow 50, and the motor was stopped with the hand 11 at station B by reversal of the switch 18b by the cam 19b. Thus, it will be observed that the plunger 35 of switch 18b rests on the high part of cam 19b, whereas the plunger of switch 18bb is still on the low part of cam 19bb. With the switches 18b and 18bb in opposite positions, the circuit from contact 45b to field winding 49 is broken by switch 18b, and the circuit from 45b to field winding 47 is broken by switch 18bb.

Assume now that the movable contact 44 of the selector switch is moved onto contact 45c. This completes a circuit through the upper contacts of switches 18cc and 18c and through the upper contacts of switch 18d and through the field winding 49, causing the motor to again operate in direction to rotate the hand 11 clockwise, which motion will be stopped by the reversal of switch 18c by cam 19c.

On the other hand it is desired to move the hand 11 from the position shown in Fig. 1 back to station A, then the movable contact 44 of the selector switch is moved onto contact 45a, completing a circuit through the upper contacts of switch 18a and the field winding 47, which rotates the motor in direction to carry the hand counterclockwise, as indicated by the arrow 51, the motion being stopped by the reversal of switch 18a by cam 19a when the hand reaches station A.

It is important to note that whenever the hand 11 is on the left side of station B, the cams 19b and 19bb close the upper contacts of switches 18b and 18bb, so that if the contact 44 of the selector switch is moved onto the contact 45b, a circuit will be completed through the field winding 49 to rotate the hand 11 clockwise toward station B. Contrariwise, whenever the hand 11 is to the right of station B, the cams 19b and 19bb will have actuated both switches 18b and 18bb to close their lower contacts and complete a circuit from contact 45b through the field winding 47 of the motor to move the hand counterclockwise toward station B.

It will be noted that whenever the selector switch contact 44 is on contact 45b, the switches 18b and 18bb must be in opposite states to break the circuit. If, following the reversal of the switch 18b by the cam 19b, the motor should coast or overrun far enough to cause the cam 19bb to reverse the switch 18bb, the motor would be reenergized through the field winding 47, causing it to start up and run in the reverse direction until it again reversed the switch 18bb. Conceivably, the motor might then coast far enough to reverse switch 18b, and the overall result would be that the motor would run successively in opposite directions, causing the hand 11 to hunt back and forth past station B.

The possibility of such hunting is reduced, in accordance with the invention, by the fact that the switches 18 have lost motion. Thus, appreciable movement of the plunger 35 is required to cause the contacts 30 to snap from their upper to their lower positions. The manner in which this reduces the likelihood of hunting will be explained with reference to the schematic diagrams of Figs. 5 to 8 respectively.

Figs. 5 to 8 show the switches 18b and 18bb actuated by reciprocating cams 19b′ and 19bb′, which are the equivalents of the rotary cams 19b and 19bb respectively. They are shown as reciprocating cams only in the interest of simplicity. However, such reciprocating cams could be driven by a pinion 22′ substituted for the bevel gear 22, and a rock 21′ substituted for the bevel gear 21 of Fig. 1.

In Fig. 5 the cam is in the position corresponding to that shown in Fig. 4, in which the switch 18b has just been reversed by the cam 19b′. It will be observed that the plunger of the switch 18b is almost, but not quite, to the top of the rise on cam 19b′. On the other hand, the plunger of switch 18bb is near the lower end of the rise on cam 19bb′, and the switch would not be actuated until the cam was moved into the position shown in Fig. 6, in which the plunger is near the top of the rise on cam 19bb′. The movement of the cam between the positions shown in Figs. 5 and 6 respectively can be made sufficiently great to insure that it is greater than the greatest possible coasting movement of the motor.

Figure 7:
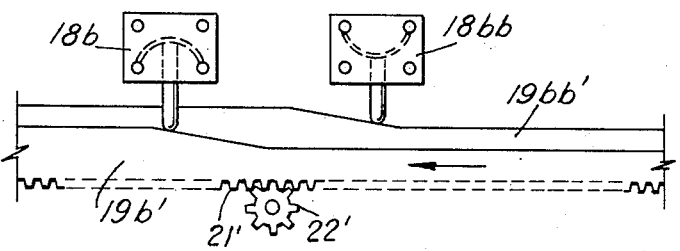
Figure 8:
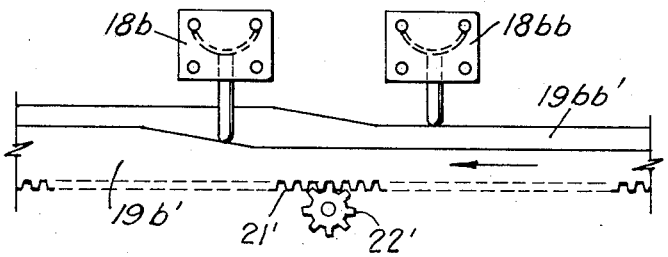

Fig. 7 shows the cam moving back to the left, in which the plunger of switch 18bb is near the lower end of the rise on cam 19bb′ and the switch has been reversed. It will be noted that the cam is in the same position in Fig. 7 as in Fig. 5, and that although in Fig. 5 switch 18b has been actuated and switch 18bb has not been actuated, the reverse is true in Fig. 7, switch 18b having not yet been actuated although switch 18bb has been. Switch 18b will not be actuated until the cam has been moved sufficiently farther to the left as shown in Fig. 8, to bring the plunger of switch 18b to the lower end of the rise on cam 19b′.

If the mechanism can be stopped very quickly, the cam setting illustrated in Figs. 5 to 8 will result in the hand 11 stopping accurately at the station irrespective of the direction of movement. This condition is usually difficult to obtain, and some allowance is made for coasting of the motor, by so adjusting the cams as to actuate the first switch, to stop the motor, slightly ahead of the desired station. This can be done without danger of hunting, because of the lag in operation of the switches.

The drawing is largely schematic and for simplicity shows an indicator hand 11 which would offer very little resistance to the driving motor, so that the extent of coasting movement following opening of the motor circuit would be determined very largely by the inertia of the system, particularly where no brake is employed. In actual practice, the present invention is usually employed to drive some device, such as a valve or the like, which offers considerable frictional resistance to movement, and the resistance of the load itself quickly stops the motion when the current to the motor is cut off. Sometimes, however, the load on the motor varies so that the extent of the coasting movement varies substantially.

An important advantage of the present invention, incorporating the snap action switches 18 having lost motion, is that the cams can be set to stop the driven device accurately at the desired position or station when the load is heavy, without danger of hunting when the load is light.

Various departures from the exact construction shown and described can be made without departing from the invention which is to be limited only to the extent set forth in the appended claims.

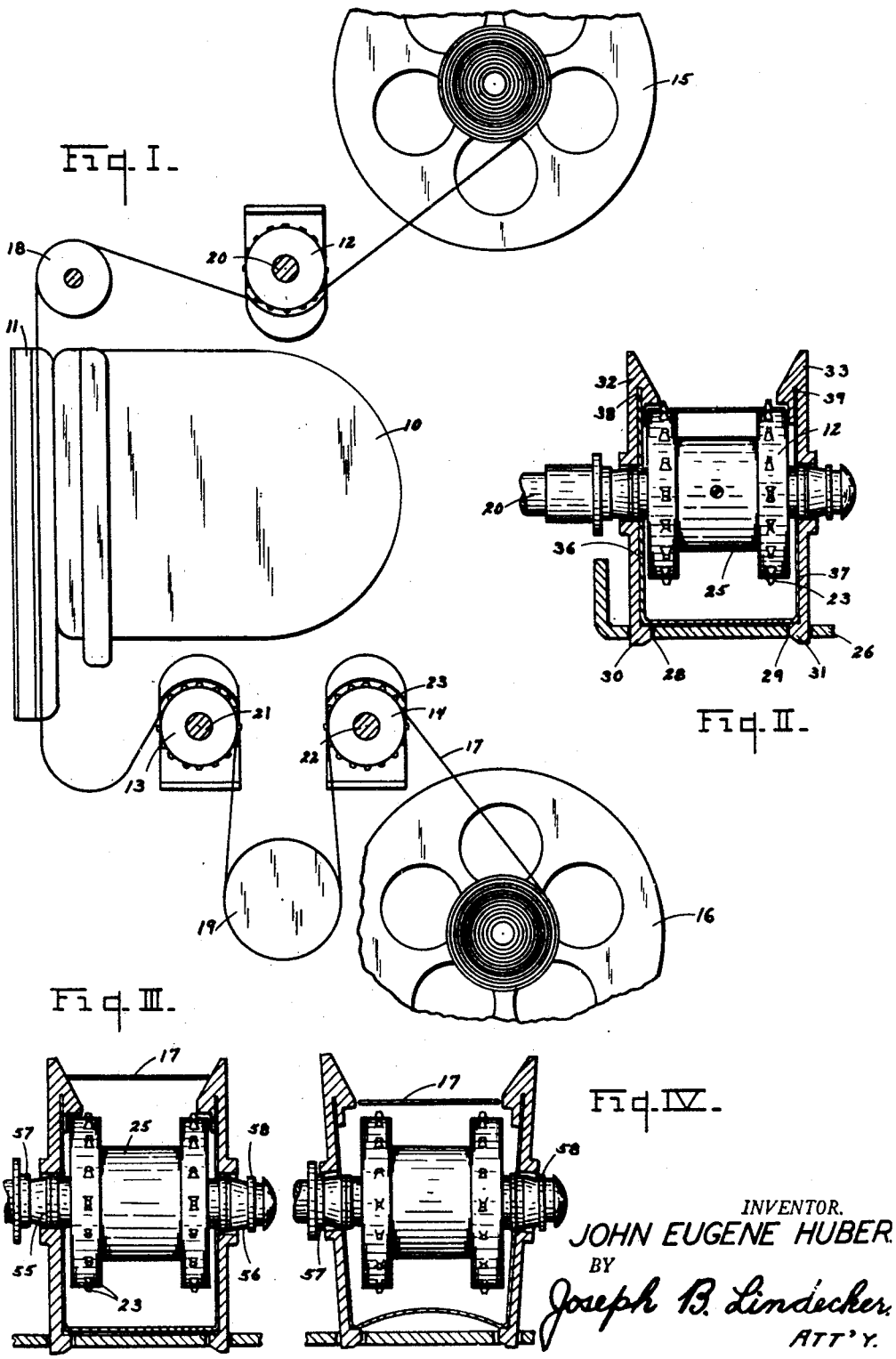

I claim:
1. In a system of the type described, a member to be moved in either direction past an intermediate station in a predetermined position and means for moving it comprising: a reversible driving motor having two circuits for rotating it in opposite directions respectively; a pair of switches associated with said station for controlling stopping of said member at said station, each switch having first contacts which it closes in a first state and having second independent contacts which it closes in a second state; means for successively actuating the two switches of each pair from their first to their second states as said member moves through the associated station in one direction and for successively actuating them in inverse sequence from their second to their first states as said member moves through the associated station in the opposite direction; a current source; and means including a master selector switch for connecting the first contacts of said two switches in series with said source and one of said motor circuits and connecting the second contacts of said two switches in series with said source and the other motor circuit; whereby one motor circuit is energized when both switches are in said first state, the other motor circuit is energized when both switches are in said second state, and neither circuit is energized through said two switches when they are in opposite states.

2. A system as described in claim 1 including end stations at the limits of movement of said member in opposite directions, limit switches associated with said two end positions, each limit switch being normally closed and connected in series with that one of said motor circuits that moves said member toward the associated end position, and means responsive to movement of said member into each end position for opening the associated limit switch.

3. A system as described in claim 1 in which each of said two switches associated with said intermediate station is of the snap-action type which snaps directly from first to second state and vice versa, a pair of cams for actuating said switches, said cams being coupled with said movable member for movement in synchronism therewith and the two cams being so timed that one cam actuates its switch from first to second state before the other cam actuates its switch from first to second state, during movement of the member in one direction past the associated station, and the other cam actuates its switch from second to first state before said one cam actuates its switch from second to first state, during movement of said member in the reverse direction past said station.

4. A system as described in claim 1 in which each of said two switches associated with said intermediate station is of the snap action type having lost motion, and a pair of cams for actuating said switches, the cams being displaced from each other to provide a lag approximately equal to the lag due to lost motion of said switches, whereby said member is stopped accurately at said station in both directions of movement while permitting substantial overrunning of said member without hunting.

5. A system as described in claim 1 including a plurality of intermediate stations in predetermined spaced positions, each station having a pair of switches associated therewith as described for said first-mentioned station, said master selector switch having a plurality of positions corresponding to the positions of said intermediate stations for selectively connecting the first contacts of the two switches of any pair in series with said source and one of said motor circuits and simultaneously connecting the second contacts of the same two switches in series with said source and the other motor circuit.

LOUIS HEGY.

REFERENCES CITED

The following references are of record in the file of this patent:

UNITED STATES PATENTS

| Number | Name | Date |
| --- | --- | --- |
| 2,055,363 | Powell | Sept. 22, 1936 |